(12) United States Patent
Zarrow et al.

(10) Patent No.: US 8,571,607 B1  
(45) Date of Patent: Oct. 29, 2013

(54) STREAMING RING TONES

(75) Inventors: Joshua Zarrow, Encino, CA (US); Robert Zacaries Evora, Douglasville, GA (US); Adrianne Binh Luu, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 846 days.

(21) Appl. No.: 11/737,348

(22) Filed: Apr. 19, 2007

(51) Int. Cl.
- *H04M 3/42* (2006.01)
- *H04M 1/00* (2006.01)

(52) U.S. Cl.
USPC ... 455/567; 455/401; 455/414.1; 379/207.16; 379/373.01; 379/373.02

(58) Field of Classification Search
USPC ........................................................ 455/567
See application file for complete search history.

(56) References Cited

U.S. PATENT DOCUMENTS

| | | | |
|---|---|---|---|
| 2003/0033214 A1* | 2/2003 | Mikkelsen et al. | 705/26 |
| 2004/0086100 A1* | 5/2004 | Moore et al. | 379/201.01 |
| 2005/0175161 A1* | 8/2005 | Reynolds et al. | 379/88.17 |
| 2005/0240487 A1* | 10/2005 | Nemetz et al. | 705/26 |
| 2005/0289622 A1* | 12/2005 | Vanlerberghe et al. | 725/100 |
| 2006/0026277 A1* | 2/2006 | Sutcliffe | 709/224 |
| 2006/0147002 A1* | 7/2006 | Desai et al. | 379/100.06 |
| 2006/0285663 A1* | 12/2006 | Rathus et al. | 379/88.22 |
| 2007/0047523 A1* | 3/2007 | Jiang | 370/352 |
| 2008/0182615 A1* | 7/2008 | Xue et al. | 455/552.1 |

FOREIGN PATENT DOCUMENTS

EP          1528765 A1 *  5/2005

OTHER PUBLICATIONS

"Ringtones for Skype", printed from the Internet on Apr. 3, 2007, 1 page, www.skype.com, city and/or country where published unknown.

* cited by examiner

*Primary Examiner* — Gennadiy Tsvey

(74) *Attorney, Agent, or Firm* — Hartman & Citrin LLC

(57) ABSTRACT

A party is alerted of an incoming telephone call using a caller-selected ring tone or other ring alert, which can be in the form of a data file streamed to the called party's phone as part of the call-setup process. The called party can be presented with options for purchasing the ring alert.

14 Claims, 4 Drawing Sheets

STREAMING RING TONES

BACKGROUND OF THE INVENTION

1. Field of the Invention

The present invention relates to providing user-selected telephone ring tones.

2. Description of the Related Art

The audible alert that a wireless mobile telecommunication device (also referred to as "user equipment"), such as a cellular telephone handset, emits to alert a user when the device receives an incoming call is typically referred to as a ring tone. A ring tone can be as simple as a single monophonic or polyphonic sound or as complex as a segment of a song or other musical segment, or a segment of recorded voice. Many wireless mobile telecommunications network service providers offer their subscribers (i.e., users of the wireless mobile devices) a service that allows a subscriber to select ring tones and wirelessly download them from the network to the subscriber's cell phone or other wireless mobile device. In this manner, the subscriber can have the device play, for example, a segment of the subscriber's favorite song upon receiving an incoming call. An example of such a service is the MEdiaNet™ service available from Cingular Wireless.

Using the cell phone or other device to which the subscriber has downloaded ring tones, the subscriber can associate selected ring tones with selected telephone numbers or groups of numbers listed in the device's electronic address book, such that when the device receives a call from an associated telephone number it emits a ring tone that is distinct from the ring tone it emits when it receives a call from other telephone numbers. The MEdia Net™ service also includes an Answer Tone feature that allows a subscriber to replace the standard ringing sound or tone that a calling party normally hears while waiting for the subscriber to answer the phone with a customized Answer Tone. An Answer Tone can include anything that can be used as a ring tone, such as a segment of a song or other musical segment, or segment of spoken voice. The MEdia Net™ Answer Tone feature also allows a subscriber to associate selected Answer Tones with selected telephone numbers or number groups, in a manner similar to that in which a subscriber can associate selected ring tones with selected numbers. However, unlike a ring tone, which is stored in the form of a data file on the subscriber's cell phone, subscribers' Answer Tones are stored on Cingular Wireless servers.

Advances in wireless mobile telecommunications network technology are also facilitating the use of wireless mobile devices as portable audio listening devices through which subscribers can select and listen to songs. The music can be wirelessly delivered to the device in the form of so-called streaming digital audio or, alternatively, downloaded to the device in the form of a digital file. The term "streaming" is used to refer to a process of delivering the data at a rate similar to that at which it is being played, such that a subscriber can listen for an essentially indefinite period of time. The streaming technology makes possible a radio station-like service through which a subscriber can listen to continuous music that a selected "station" is transmitting. The term "playing (a data file or something representing a data file)" is used in the art to refer to the process of transforming a data file (e.g., through decompression, decoding, conversion, etc.) into a form in which it is output for the user to hear (or view, in the case of a video medium).

It is desirable to provide telecommunication service subscribers with substantial flexibility in customizing ring tones and similar features. The present invention provides a system and method that addresses the above-described problems and deficiencies in the manner described below.

SUMMARY OF THE INVENTION

The present invention relates to a system and method in a telecommunications network for alerting a called party of an incoming telephone call using a party-selected ring tone or other ring alert. The term "ring alert" as used herein is not limited to a ring "tone" but rather can comprise any suitable media segment, such as a segment of music or other sound, a segment of text, or a segment of video. The media segment can be selected by the called party or, alternatively, by the calling party, and can be streamed to the called party's telephone as part of the process of receiving an incoming call.

In an exemplary embodiment of the invention, a network service provider offers the above-described ring alert selection method as a service to its subscribers (for which the service provider can charge a fee). A subscriber can select a ring tone or other ring alert by accessing a media application subsystem of the service provider network, via a Web-based or similar interface from a computer, via wireless Internet from the subscriber's cellular telephone or other wireless mobile user equipment (UE), or via any other suitable means. A subscriber can associate a selected ring alert with a selected telephone number or group of telephone numbers, so that the selected ring alert occurs only upon a call involving a selected number, thereby allowing the subscriber to associate uniquely distinguishable ring alerts with various persons with whom the subscriber is likely to conduct telephone calls. Alternatively, the subscriber can select a ring alert to use for all calls. The subscriber can select not only ring alerts for the subscriber's incoming calls but also ring alerts for outgoing calls to alert the called party of a call.

For example, a subscriber can select a ring alert that the subscriber wishes a party to hear (or otherwise experience, in the case of video, text, etc., and combinations thereof) upon an incoming call to the party from the subscriber. Then, when the subscriber calls the party, the network streams a data file to the called party telephone, which plays the data file, thereby allowing the called party to hear the caller-selected ring alert rather than an ordinary ring tone.

DETAILED DESCRIPTION

Figure 1:
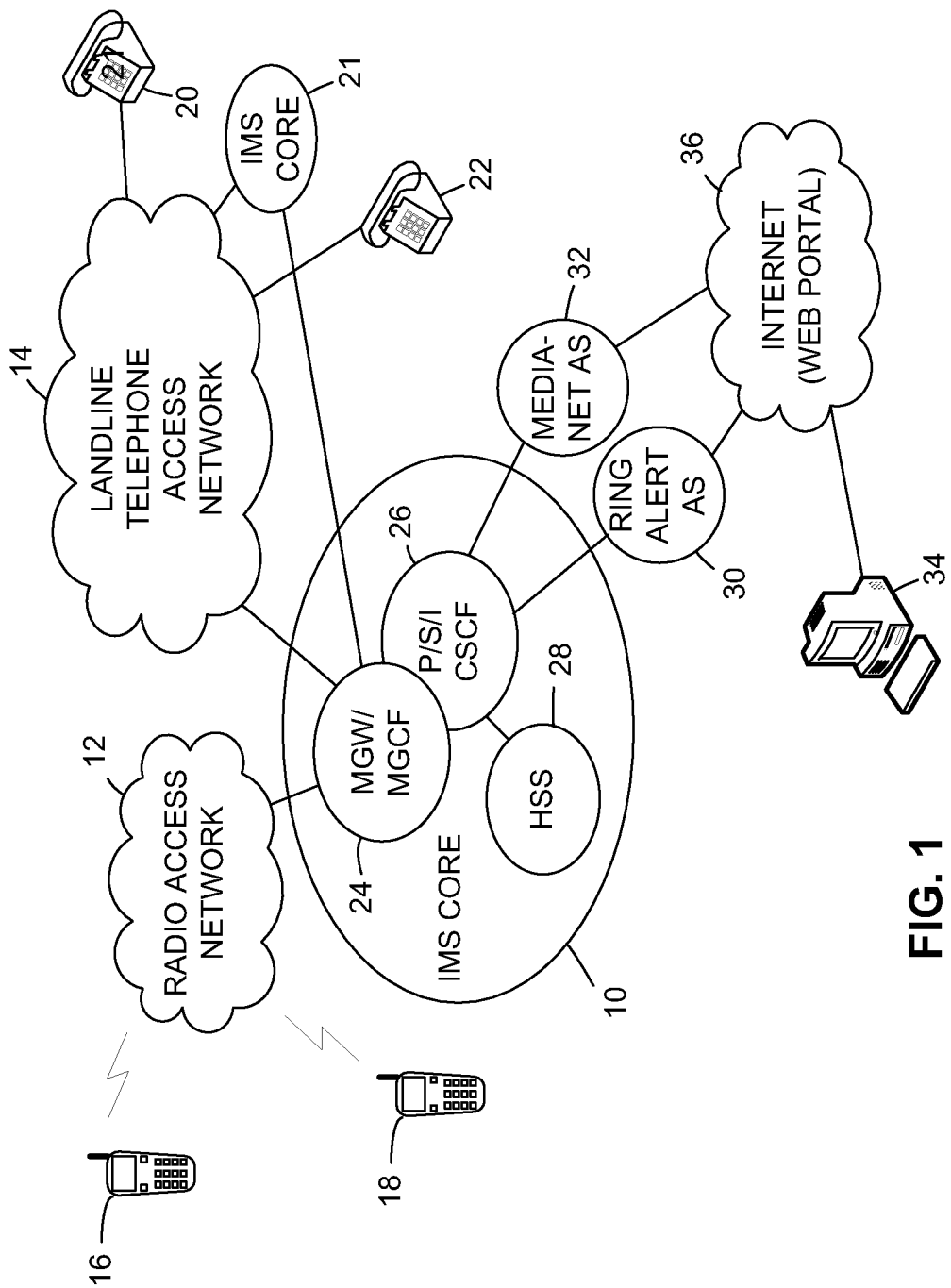
FIG. 1 is a network diagram, illustrating a telecommunications network in accordance with an exemplary embodiment of the invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order or combined with each other or divided apart in any suitable manner.

As illustrated in FIG. 1, in an exemplary embodiment of the invention, a telecommunications network includes an IP Multimedia Subsystem (IMS) core 10, a radio access network 12 and a landline telephone access network 14. Radio access network 12 can comprise any suitable type of wireless mobile telecommunications access network that is compatible with the well-known IMS technology, such as a cellular telephone network of the so-called second-generation type (e.g., GSM, CDMA, TDMA, etc.) or third-generation (e.g., UMTS) type, a wireless local area network (WLAN), etc. As known in the art, IMS technology allows for the convergence of disparate access technologies, so that communications such as telephone calls can be conducted using any suitable type of user equipment through a corresponding access network type. For example, the telephones referred to with regard to the present invention can comprise IMS-compatible wireless mobile user equipment (UE) 16, 18, etc. that communicate via radio access network 12. Alternatively, or in addition, the telephones can comprise landline telephones 20, 22, etc. Landline telephone access network 14 represents the telecommunications equipment, such as an IMS core 21, operated by a landline-based telecommunications network service provider, along with the Public Switched Telephone Network (PSTN) and associated signaling (SS7) network that the service provider's equipment uses to connect telephone calls involving landline telephones 20, 22, etc.

In the illustrated embodiment, IMS core 10 comprises at least the following elements, which can be of conventional type well known to persons skilled in the art: a media gateway (MGW) and media gateway control function (MGCF) 24, call session control functions (CSCF) 26, and a home subscriber server (HSS) 28. IMS core 10 further comprises a ring alert application subsystem (AS) 30 and a media application subsystem 32. Other elements commonly included in IMS-based networks are not shown for purposes of clarity. Media application subsystem 32 can comprise a system such as the MEdiaNet system developed by Cingular Wireless. Ring alert application subsystem 30 and a media application subsystem 32 can comprise computer equipment of the type generally referred to as application servers and are programmed or configured as described below to effect the methods of the present invention. In addition to the novel functions described below, media application subsystem 32 allows subscribers to the MEdia Net service (i.e., users of UE 16, 18, etc.) to perform conventional MEdiaNet functions such as downloading ring tones and other multimedia items to their UE's, selecting Answer Tones, etc. As the manner in which users perform such functions and the processes by which ring tones and similar multimedia items are downloaded to UE's 16, 18, etc. are well understood by persons skilled in the art, they are not described in further detail herein. Although ring alert application subsystem 30 and media application subsystem 32 are shown as separate elements for purposes of illustration, in other embodiments of the invention functions or elements of ring alert application subsystem 30 and media application subsystem 32 can be combined.

In accordance with an exemplary method of the present invention, ring alert application subsystem 30 is programmed or configured to cause IMS core 10 to receive a ring alert selection initiated by either the calling party or the called party as well as to send a ring alert response to the called party telephone. The ring alert selection represents or identifies a media segment that one of the parties has selected from among a catalog or database of such media segments. For example, a party can use a computer to access ring alert application subsystem 30 via a Web portal to the Internet 36 and provide ring alert selections. Alternatively, a party can access ring alert application subsystem 30 using one of UE's 16, 18, etc. via radio access network 12 (i.e., so-called "wireless Internet access") to provide ring alert selections. The Web-based user interface can present the user with a list of media segments from which the user can choose in essentially the same manner in which Cingular's MEdiaNet allows subscribers to select ring tones and Answer Tones, associate Answer Tones with selected telephone numbers, and perform other conventional functions relating to ring tones and Answer Tones. As the manner in which users perform such functions and the processes by which IMS core 10 or a similar group of network elements uses the tones in connection with telephone calls are well understood by persons skilled in the art, they are not described in further detail herein.

The ring alert response causes the called party telephone (e.g., one of UE's 16, 18, etc. or one of landline telephones 20, 22, etc.) to play a data file represented by the selected media segment in response to an incoming telephone call. As noted above, the media segment can be selected by a subscriber associating it with the called party's telephone number, so that whenever the subscriber calls that party, the called party's telephone outputs the media segment rather than rings in the conventional manner.

Figure 2:
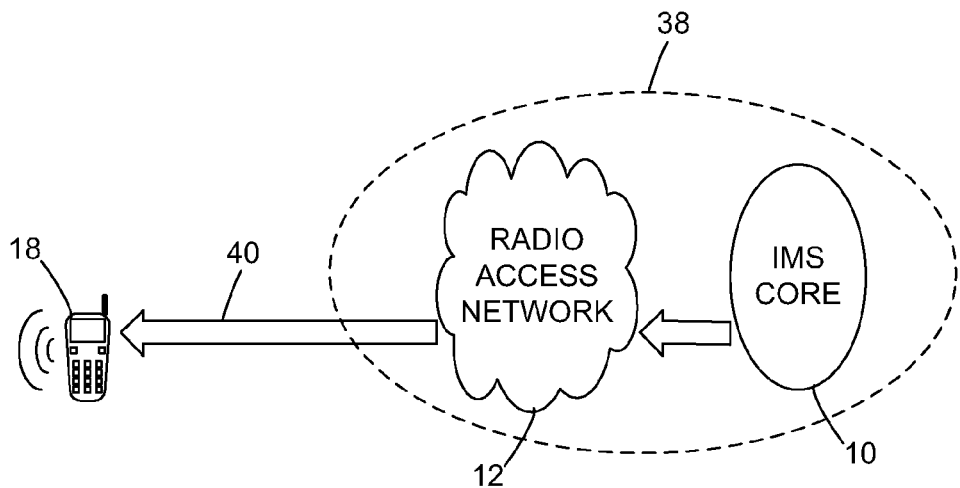
FIG. 2 is an exemplary data flow diagram, illustrating the network of FIG. 1 transmitting a ring alert response to a called party in the form of a streaming data file in response to a call-setup process.

In an example illustrated in FIG. 2, when a party calls UE 18, the network 38 sends a ring alert response 40 in the form of streaming data, as part of the process of setting up the telephone call. For example, in an embodiment in which radio access network 12 is of the GSM type, network 38 can transmit the streaming data to UE 18 immediately after transmitting the "Call Control (CC) Call Setup" message that is conventionally transmitted or, alternatively, immediately after network 38 receives the conventional "CC Call Confirmed" message from UE 18. Network 38 streams the data from a data file stored, for example, in media application subsystem 32 (FIG. 1) or, alternatively, in ring alert application subsystem 30. The data file can have been pre-stored there in essentially the same manner in which conventional ring tones are pre-stored in anticipation of downloading them to user equipment. Network 38 can identify the data file to be streamed from among the various data files stored there by matching the called party telephone number involved in the call with a number that, in the manner described above, a subscriber has chosen to associate with the media segment (representing the data file). For example, if a subscriber has made a ring alert selection by associating a segment of a song or other ring tone with the telephone number of UE 18, then as part of the call-setup process network 38 streams the ring tone data file to UE 18. As UE 18 receives the data stream, UE 18 plays it to alert the user of UE 18 of the incoming call, as described in further detail below.

Figure 3:
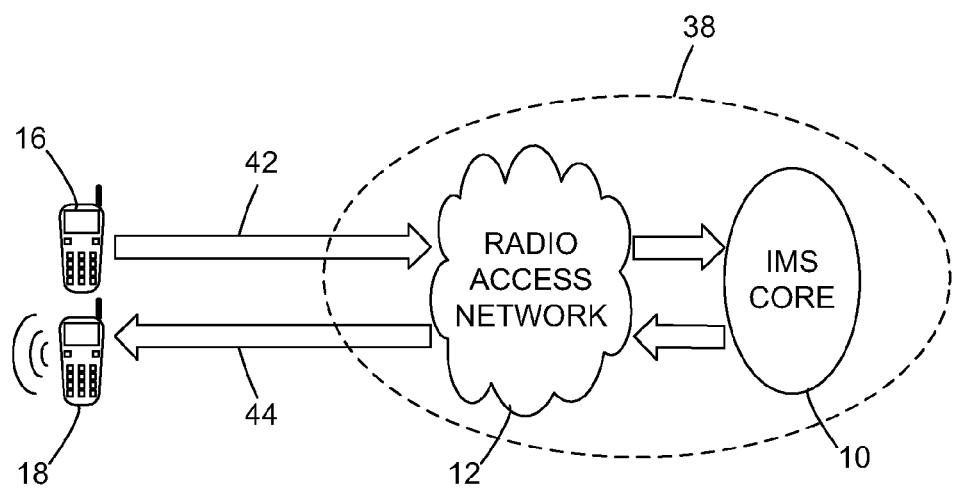
FIG. 3 is an exemplary data flow diagram, illustrating the network of FIG. 1 transmitting a ring alert response to a called party in the form of a streaming data file in response to receiving a ring alert selection from a calling party in the form of a streaming data file.

In another example, illustrated in FIG. 3, network 38 receives from UE 16 a ring alert selection 42 in the form of a streaming ring alert. The streaming ring alert comprises data that UE 16 streams from a data file that has been pre-stored in UE 16. For example, the party using UE 16 may have pre-downloaded a ring tone from network 38 to UE 16 (i.e., at some time prior to making and receiving the calls referred to herein). In this example, UE 16 sends ring alert selection 42 in conjunction with the process of setting up a telephone call from UE 16 to UE 18. In other words, when the party using UE 16 places a call to UE 18, not only does network 38 set the call up in the conventional manner but it also receives ring alert selection 42 from UE 16 as part of the sequence of steps that a call-setup process comprises. For example, in an embodiment in which radio access network 12 is of the GSM type, UE 16 can transmit the streaming data to network 38 immediately after it receives the "CC Call Proceeding" message that a GSM network conventionally transmits or, alternatively, immediately after UE 16 receives the conventional "CC Alerting" message from the network. As a further part of the call-setup process, network 38 sends a ring alert response 44, also in streaming form, to UE 18. The data that network 38 streams in ring alert response 44 is the data that network 38 received in ring alert selection 42. As UE 18 receives the data stream, UE 18 plays it to alert the user of UE 18 of the incoming call, as described in further detail below.

Figure 4:
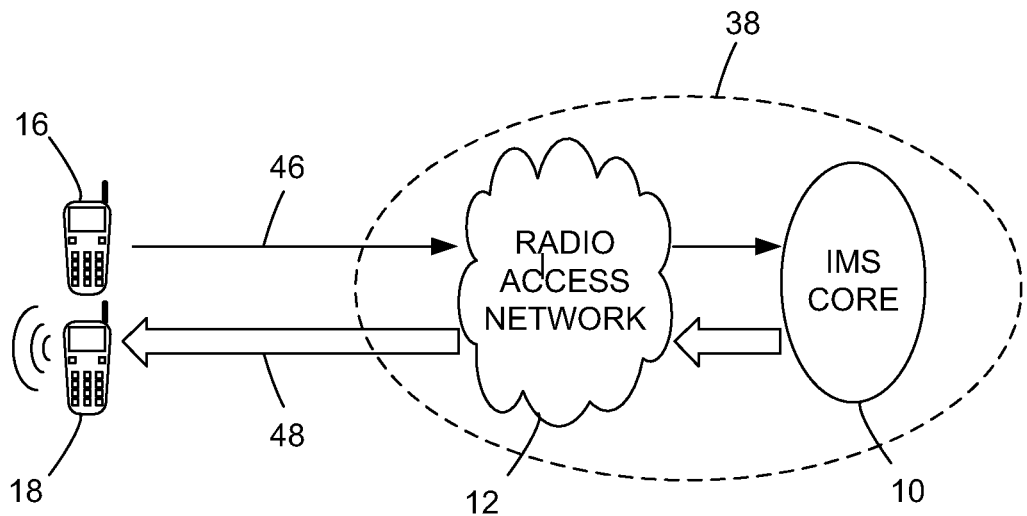
FIG. 4 is another exemplary data flow diagram, illustrating the network of FIG. 1 transmitting a ring alert response to a called party in the form of a streaming data file in response to receiving a ring alert selection from a calling party in the form of a ring alert identifier.

In a further example, illustrated in FIG. 4, network 38 receives from UE 16 a ring alert selection 46 in the form of a ring alert identifier as part of the call-setup process. The ring alert identifier comprises information identifying a ring alert from among those (data files) stored in, for example, media application subsystem 32 (FIG. 1) or, alternatively, ring alert application subsystem 30. As a further part of the call-setup process, network 38 sends a ring alert response 48 to UE 18 in the form of data streamed from the identified data file. As UE 18 receives the data stream, UE 18 plays it to alert the user of UE 18 of the incoming call, as described in further detail below.

Figure 5:
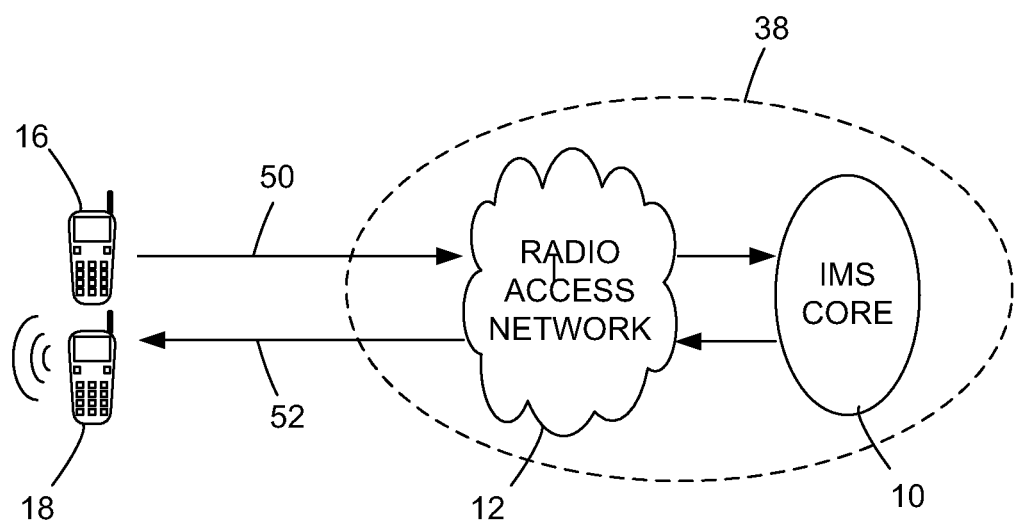
FIG. 5 is still another exemplary data flow diagram, illustrating the network of FIG. 1 transmitting a ring alert response to a called party in the form of a ring alert identifier to receiving a ring alert selection from a calling party in the form of a ring alert identifier.

In a further example, illustrated in FIG. 5, network 38 receives from UE 16 a ring alert selection 50 in the form of a ring alert identifier as part of the call-setup process, as described above with regard to the previous example. As a further part of the call-setup process, network 38 sends a ring alert response 52 to UE 18 in the form of the ring alert identifier. In other words, network 38 forwards the ring alert identifier to UE 18. The ring alert identifier identifies a ring alert from among those (data files) stored in UE 18, such as a ring alert data file that the user of UE 18 has downloaded to its memory from network 38 at a time prior to the call. As UE 18 receives the ring alert identifier, UE 18 retrieves from memory and plays the identified ring alert (data file), to alert the user of UE 18 of the incoming call, as described in further detail below.

In an instance in which the called party telephone is a landline telephone 20, 22, etc., IMS core 21 (FIG. 1) detects the ring alert response provided by IMS core 10 and provides the ring alert to the called party telephone in a format that the telephone is capable of receiving and utilizing. IMS core 21 can include an application server (not shown) that controls these functions.

Figure 6:
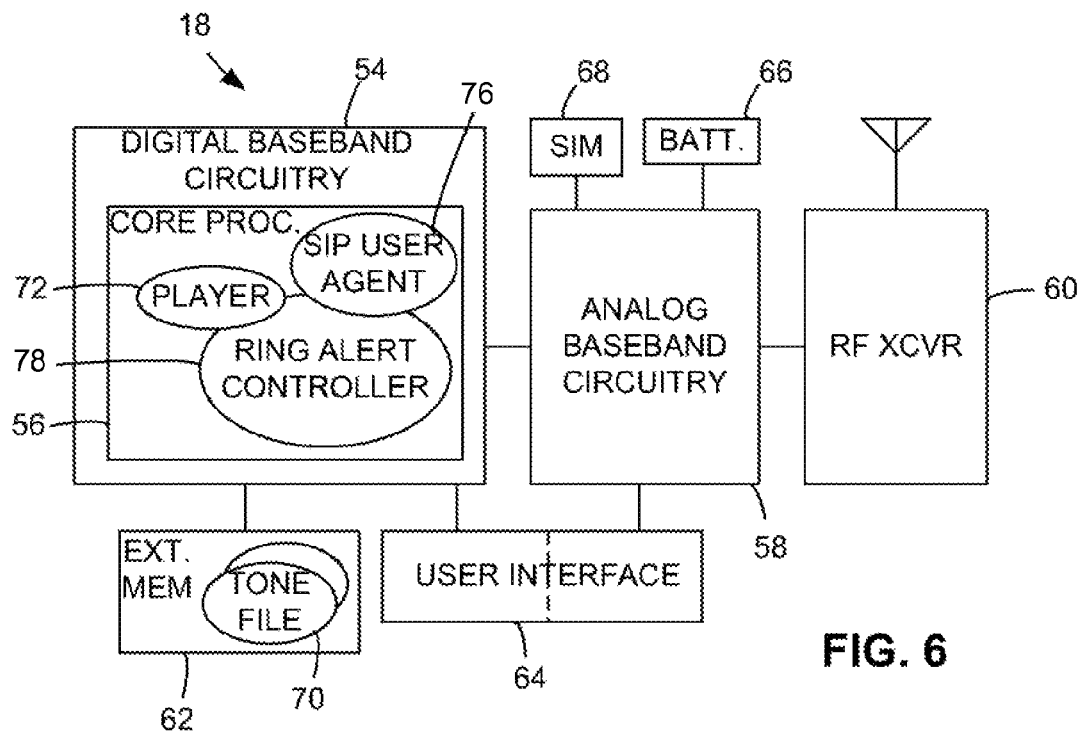
FIG. 6 is a block diagram of an exemplary user equipment (UE).

As illustrated in FIG. 6, UE 18 (or any other user equipment that may receive a call in accordance with an exemplary embodiment of the invention) includes digital baseband circuitry 54 having core processing logic 56 that is programmed or configured to perform the exemplary method described below in addition to conventional methods relating to the making and receiving of calls and other conventional operations of the types commonly performed in such user equipment. In addition to digital baseband circuitry 54 that performs essentially all of the digital operations needed to operate UE 18, UE 18 includes analog baseband circuitry 58 that performs essentially all of the analog operations, and radio frequency (RF) transceiver circuitry 60 that defines the UE side of the air interface. Digital baseband circuitry 54 is coupled to external memory 62 and digital portions of the user interface 64, such the display screen, keypad, and other such digital user interface elements commonly included in conventional cellular telephones and other types of user equipment. Analog baseband circuitry 58 is coupled to a battery 66, a SIM card 68, and analog portions of user interface 64, such as the microphone, speaker, vibrator (buzzer), LED indicator lamp, and other such analog user interface elements. The UE 18 can include additional elements of the types commonly included in conventional cellular telephones and other types of user equipment, but such elements are not shown for purposes of clarity. Note that the above-described architecture of UE 18 is intended only to be exemplary, and persons skilled in the art will readily be capable of embodying this aspect of the invention in any other suitable type of user equipment.

In the exemplary embodiment, the aspect of UE 18 that relates most directly to the present invention is the programmed or configured core processing logic 56. Processing logic 56 can comprise, for example, a programmed processor or controller or other hardware, software, firmware or combination thereof. In addition to processing logic 56, digital baseband circuitry 54 includes internal memory (not separately shown), digital signal processing circuitry (not separately shown) that performs GSM encoding and decoding and other functions, and other elements of the types commonly included in the digital portions of a GSM UE.

Figure 7:
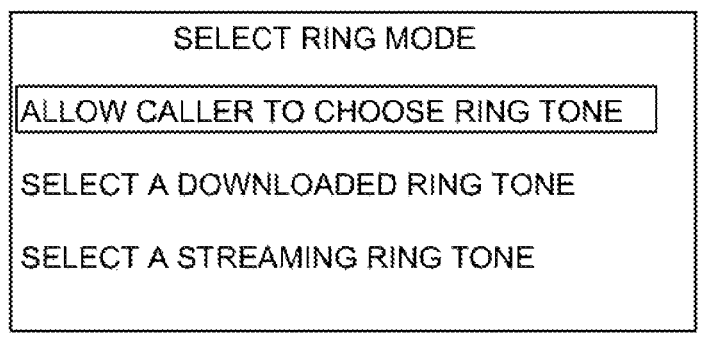
FIG. 7 illustrates an exemplary screen display on the called party UE.

Processing logic 56 is programmed or configured to process received ring alert responses and causes user interface 64 to produce the ring alert. For example, its programming can include elements that enable IMS functions, such as a SIP user agent 76 and a ring alert controller 78. Ring alert controller 78 can control user interface 64 in a manner that displays a menu of ring alert options from which the user can choose, and responds to the user's selection of an option, as illustrated by the screen display of FIG. 7. Each option represents a different way in which UE 18 can produce a ring tone (or other ring alert) in response to an incoming telephone call. For example, one option is for the user to leave the ring alert selection choice up to the caller, as discussed above with regard to the examples shown in FIGS. 3-5. If the user selects this option, then upon occurrence of an incoming call, UE 18 plays a ring alert that the caller has chosen, as discussed above with regard to the examples shown in FIGS. 3-5. Another option is for the user to select from among a number of ring tone data files 70 that have been downloaded to or otherwise pre-stored in memory 62 in the conventional manner. If the user selects this option, then upon occurrence of an incoming call, UE 18 plays the selected downloaded ring tone in the conventional manner. Still another option is for the user to select from among a number of ring tones that network 38 makes available for streaming during the call-setup process as described above. Although not shown for purposes of clarity, network 38 can provide a Web interface through which the user can select a ring tone for streaming in essentially the same manner as that in which a user can conventionally (e.g., via Cingular Wireless's MEdiaNet service) select a ring tone for downloading to a user equipment or an Answer Tone for streaming to a user equipment.

As a SIP-enabled user equipment, UE 18 can be queried by network 38 for its capabilities and configuration as part of the call-setup process. Ring tone controller 78 can control this query and response process. UE 18 can respond to such a query by providing information indicating the type and form of ring alert it is set up to receive. For example, the ring alert type can indicate that UE 18 is to use a ring tone chosen by the caller or, alternatively, that UE 18 is to use a ring tone that has been pre-downloaded to UE 18. The ring alert form can indicate that UE 18 is to receive the ring alert in the form of a streaming data file or, alternatively, in the form of a ring alert identifier. It is also possible in some instances for some types of user equipment (not shown) to respond, when queried for their capabilities and configuration, by indicating that they are not equipped to handle the streaming ring tones described herein.

In embodiments of the invention in which the user equipment receiving the call is not SIP-enabled (e.g., the user equipment is only compatible with second-generation network technology), it can include a JAVA software applet or similar programming that performs ring alert processing functions similar to those described above.

Processing logic 56 further includes a suitable player 72. Whether the data file that the ring alert represents is in the form of a streaming data file being received from network 38 or in the form of a pre-stored data file 70 being read from memory 62, ring alert controller 78 causes player 72 to reproduce the media segment representing the data file. Note that in an instance in which the data file is a streaming data file, player 72 plays the data file as UE 18 is receiving it from network 38, i.e., in the manner commonly known in the art as "streaming." As known in the art, and as the term is used herein, "streaming" refers to a process of delivering the data at a rate similar to that at which it is being played, such that the user equipment continues to produce the audible, visual, etc. output for as long as it continues to receive the data stream.

As noted above, the ring alert can be in the form of one or more audible or visible media segments. Accordingly, ring alert controller 78 communicates the output of player 72 to the speaker or display of user interface 64 (via a digital-to-analog conversion by analog baseband circuitry 58), so that the user can perceive the sound, music, text, video, etc. that is intended to alert the user of the incoming phone call. Ring alert controller 78 causes player 72 to cease playing the data file when the user answers the telephone call or a suitable predetermined timeout interval elapses. In some embodiments of the invention, ring alert controller 78 can temporarily save a streamed data file to memory 62 after initially playing it in the streaming manner and thereafter play it repeatedly in a continuous-loop fashion, until the user either answers the call or a suitable predetermined timeout interval elapses. In summary, UE 18 uses a streaming ring alert in essentially the same manner as that in which it uses a conventional (downloaded) ring tone to alert a user of an incoming call.

Figure 8:
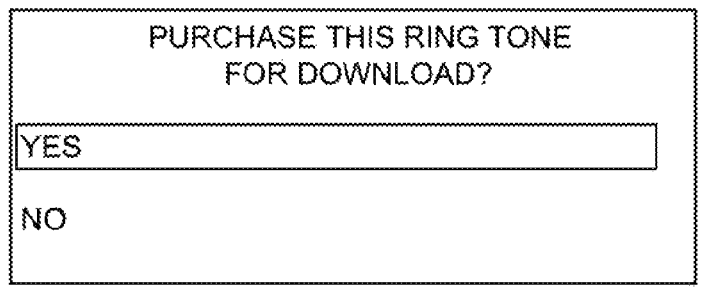
FIG. 8 illustrates another exemplary screen display on the called party UE.

In the exemplary embodiment of the invention, ring alert controller 78 can control user interface 64 in a manner that queries whether the user would like to purchase a caller-selected ring alert for downloading, and processes the user's response, as indicated by the screen display of FIG. 8. This screen can be displayed after the user answers the call or, alternatively, after the call ends. Ring alert controller 78 can temporarily save a streamed data file to memory 62 after initially playing it in the streaming manner and, if the user elects to purchase it, initiate a process similar to that in which a network downloads a ring tone. Network 38 can charge the user for the download in essentially the same manner as that in which a network conventionally charges users for downloading ring tones, such as by causing UE 18 to display the cost and requesting that the user select "Yes" to confirm the purchase. As the data file has already been stored in memory 62 network 38 need not download it again, but network 38 can instruct UE 18 to enable selection of the data file by the user for use as a ring alert. Although not shown for purposes of clarity, network 38 can present the user with options for not only purchasing the ring alert but also purchasing a greater work, such as a song of which the ring alert is a portion or partial segment.

For example, a subscriber may select a ring tone that is a clip or snippet of a popular song that he or she wishes to have a friend hear when the subscriber calls the friend's phone (e.g., UE 18). The subscriber associates the selected ring tone with the friend's telephone number and calls the friend. As part of the call-setup process, network 38 streams the selected ring tone to UE 18. In response to the incoming call, the friend's phone plays the ring tone. When the friend answers the call, the phone stops playing the ring tone and displays a purchase query (FIG. 8). The purchase query may be provided in the form of a selectable "buy now" button either as a soft key, a hard key button on the keyboard, and the like. The purchase query allows the friend the ability to purchase not only the ring tone but, alternatively or in addition, the whole song. If the ring tone is purchased, the network enables it to work thereafter in the same manner as a conventional ring tone on the person's phone. If the whole song is purchased, the network makes the song available to the person in any suitable manner, such as allowing the person to play the song on UE 18 via wireless Internet service or, alternatively, on a suitable player (e.g., operating on computer 34 of FIG. 1) via wireline Internet service. The purchase transaction can appear on the person's regular monthly wireless network service bill in the same manner in which charges for conventional downloads are handled or can be handled in any other suitable manner.

For illustrative purposes, in the examples described above the calling party and called party telephones are on the same network. However, as persons skilled in the art can appreciate, the invention operates in essentially the same manner as described above in instances in which the calling party and called party telephones are on different networks. For example, a mobile telephone may be roaming on a different network. Or the network service provider that operates IMS core 21 (FIG. 1) and associated network equipment through which landline telephone service is provided to telephones 20 and 22 may be different from the network service provider that operates IMS core 10 and associated network equipment.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:
1. A method comprising:
receiving, at a server, a ring alert selection from a calling party telephone, the ring alert selection representing a media segment selected from a plurality of party-select- able media segments, the ring alert selection associated with a called party telephone;

receiving, at the server from the called party telephone, a type and a form of media segment that the called party phone is capable of receiving, wherein the type and the form of media segment comprises an indication that the called party telephone uses media segments selected by calling party telephones;

in response to an incoming telephone call initiated by the calling party telephone to the called party telephone, sending, by the server, a ring alert response to the called party telephone, wherein sending the ring alert response comprises streaming, by the server, the media segment to the called party telephone, the media segment being a portion of a greater work available for purchase, the media segment temporarily stored as a data file on the called party telephone;

after streaming the media segment to the called party telephone, providing, by the server to the called party telephone, a purchase query for display on the called party telephone, the purchase query presenting an option to a user of the called party telephone to purchase the media segment streamed to the called party telephone and the greater work;

receiving, by the server from the called party telephone, an election to purchase the media segment and the greater work; and in response to receiving the election to purchase the media segment and the greater work,
  instructing, by the server, the called party telephone to enable selection of the data file associated with the media segment, and
  streaming, by the server, the greater work to the called party telephone.

2. The method of claim 1, wherein sending the ring alert response to the called party telephone includes sending the ring alert response via the Public Switched Telephone Network to a landline telephone.

3. The method of claim 1, wherein sending the ring alert response to the called party telephone includes sending the ring alert response wirelessly to a cellular mobile telephone.

4. The method of claim 1, wherein the media segment includes at least one of sound, music, text, and video.

5. The method of claim 1, wherein streaming the media segment includes streaming the media segment during a call setup phase for the incoming telephone call.

6. The method of claim 1, further comprising, prior to streaming the media segment to the called party telephone, receiving the media segment from the calling party telephone on which the media segment is stored.

7. The method of claim 1, further comprising:
receiving a ring alert identifier; and
based on the ring alert identifier, streaming the media segment from a telecommunications network media subsystem.

8. The method of claim 5 wherein streaming the media segment during the call setup phase for the incoming call comprises streaming the media segment after transmitting a call control call setup message to the called party telephone.

9. A method comprising:
receiving, at a server from a calling party telephone, a ring alert selection, the ring alert selection representing a media segment selected from a plurality of party-selectable media segments, the ring alert selection associated with a called party telephone;

receiving, at the server, a type and a form of media segment from the called party telephone that the called party phone is capable of receiving, wherein the type and the form of media segment comprises an indication that the called party telephone uses media segments selected by calling party telephones;

in response to an incoming telephone call initiated by the calling party telephone to the called party telephone,
  matching, by the server, a number associated with the calling party telephone with a number associated with the media segment, and
  sending, by the server, a ring alert response including the ring alert selection to the called party telephone, wherein sending the ring alert response comprises streaming, by the server, the media segment to the called party telephone, the media segment being a portion of a greater work available for purchase, the media segment temporarily stored as a data file on the called party telephone;

after streaming the media segment to the called party telephone, providing, by the server to the called party telephone, a purchase query for display on the called party telephone, the purchase query presenting an option to a user of the called party telephone to purchase the media segment streamed to the called party telephone and the greater work;

receiving, by the server from the called party telephone, an election to purchase the media segment and the greater work from the called party telephone; and in response to receiving the election to purchase the media segment and the greater work,
  instructing, by the server, the called party telephone to enable selection of the data file associated with the media segment, and
  streaming, by the server, the greater work to the called party telephone.

10. The method of claim 9, wherein sending the ring alert response to the called party telephone includes sending the ring alert response wirelessly to a cellular mobile telephone.

11. The method of claim 10, wherein the media segment includes at least one of sound, music, text, and video.

12. The method of claim 11, wherein streaming the media segment includes streaming the media segment during a call setup phase for the incoming telephone call.

13. The method of claim 11, further comprising, prior to streaming the media segment to the called party telephone, receiving the media segment from the calling party telephone on which the media segment is stored.

14. The method of claim 11, further comprising:
receiving a ring alert identifier; and
based on the ring alert identifier, streaming the media segment from a telecommunications network media subsystem.

* * * * *